(12) United States Patent
Peuker et al.

(10) Patent No.: US 9,809,918 B2
(45) Date of Patent: *Nov. 7, 2017

(54) DAMPER

(71) Applicant: SUSPA GMBH, Altdorf (DE)

(72) Inventors: Thomas Peuker, Ammerthal (DE);
Dieter Mayer, Sulzbach-Rosenberg (DE); Michael Weder, Nürmberg (DE)

(73) Assignee: SUSPA GMBH, Altdorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/927,899

(22) Filed: Oct. 30, 2015

(65) Prior Publication Data

US 2016/0053424 A1 Feb. 25, 2016

Related U.S. Application Data

(63) Continuation of application No. 14/143,732, filed on Dec. 30, 2013, now Pat. No. 9,222,537, which is a continuation of application No. 11/756,094, filed on May 31, 2007, now Pat. No. 8,640,837.

(30) Foreign Application Priority Data

May 31, 2006 (DE) .................. 10 2006 025 749

(51) Int. Cl.
| | |
|---|---|
| *F16F 11/00* | (2006.01) |
| *D06F 37/20* | (2006.01) |
| *F16F 7/08* | (2006.01) |
| *F16F 7/09* | (2006.01) |
| *F16F 9/32* | (2006.01) |

(52) U.S. Cl.
CPC ............... *D06F 37/20* (2013.01); *F16F 7/08* (2013.01); *F16F 7/09* (2013.01); *F16F 9/3235* (2013.01)

(58) Field of Classification Search
CPC ...... F16F 7/08; F16F 7/09; F16F 69/00; F16F 7/087; F16F 7/095; B60G 13/02; B60G 13/04; B60G 2202/23; D06F 37/20
USPC ........ 188/381, 250 B; 267/196, 134; 68/23.1
See application file for complete search history.

(56) References Cited

U.S. PATENT DOCUMENTS

| | | | | |
|---|---|---|---|---|
| 9,222,537 B2 * | 12/2015 | Peuker | ...................... | F16F 7/09 |
| 2002/0170794 A1 | 11/2002 | Dubach | | |
| 2007/0017260 A1* | 1/2007 | Dillmann | ................. | F16F 7/09 |
| | | | | 68/23.1 |

(Continued)

FOREIGN PATENT DOCUMENTS

| | | |
|---|---|---|
| DE | 2602620 A1 | 7/1977 |
| DE | 3513838 A1 | 10/1986 |
| DE | 3908191 A1 | 9/1990 |

(Continued)

*Primary Examiner* — Nicholas J Lane
(74) *Attorney, Agent, or Firm* — Browdy and Neimark, P.L.L.C.

(57) ABSTRACT

Damper, in particular for washing machines with a spin cycle, with a housing having a central longitudinal axis and at least partially encompassing a housing interior by housing walls, a plunger displaceable in the housing along the central longitudinal axis, guided out of the housing and having at least one friction lining recess, fastening elements, arranged on open ends of the housing and the plunger, and at least one friction lining, arranged in the at least one friction lining recess and in frictional contact with opposite housing walls.

7 Claims, 11 Drawing Sheets

(56) References Cited

U.S. PATENT DOCUMENTS

2007/0039792 A1  2/2007  Peuker et al.

FOREIGN PATENT DOCUMENTS

| | | |
|---|---|---|
| DE | 29720092 U1 | 3/1998 |
| DE | 102004033531 A1 | 2/2005 |
| EP | 0697539 B1 | 2/1996 |
| EP | 0965675 A1 | 12/1999 |
| GB | 1523497 | 9/1978 |
| JP | 04/056972 U1 | 5/1992 |
| JP | 07098041 A | 4/1995 |
| JP | 2002/113283 A | 4/2002 |
| JP | 2002/181131 A | 6/2002 |
| JP | 2002/242986 A | 8/2002 |
| WO | 2005/007964 A1 | 1/2005 |

\* cited by examiner

DAMPER

BACKGROUND OF THE INVENTION

Field of the Invention

The invention relates to a damper, in particular a friction damper as used, for example, in washing machines with a spin cycle.

Background Art

A friction damper with a rectangular housing is known from EP 0 697 539 B1. The plunger has friction linings on opposite sides. Moreover, manufacture of the housing is extremely expensive.

SUMMARY OF THE INVENTION

The object of the invention is to create a friction damper which can be produced simply and at reasonable cost.

The object is achieved by a damper with a housing having a central longitudinal axis, at least partially encompassing a housing interior by housing walls, a plunger displaceable in the housing along the central longitudinal axis, guided out of the housing and having at least one friction lining recess, fastening elements, arranged at free ends of the housing and the plunger, and at least one friction lining, arranged in the at least one friction lining recess and in frictional contact with opposite housing walls. The basis of the invention is to provide a continuous window on the inside end of a plunger guided in a housing, in which window a friction lining is arranged. This one friction lining is in frictional contact with opposite inside walls of the housing. The attenuation characteristics of the damper can be freely set by the configuration of the window—the friction lining recess—and of the friction lining. Moreover, the arrangement has the advantage that only one single friction lining is required for friction on two friction surfaces.

Additional features and details of the invention emerge from the description of several embodiments with the aid of the drawings.

DESCRIPTION OF THE PREFERRED EMBODIMENTS

Figure 1:
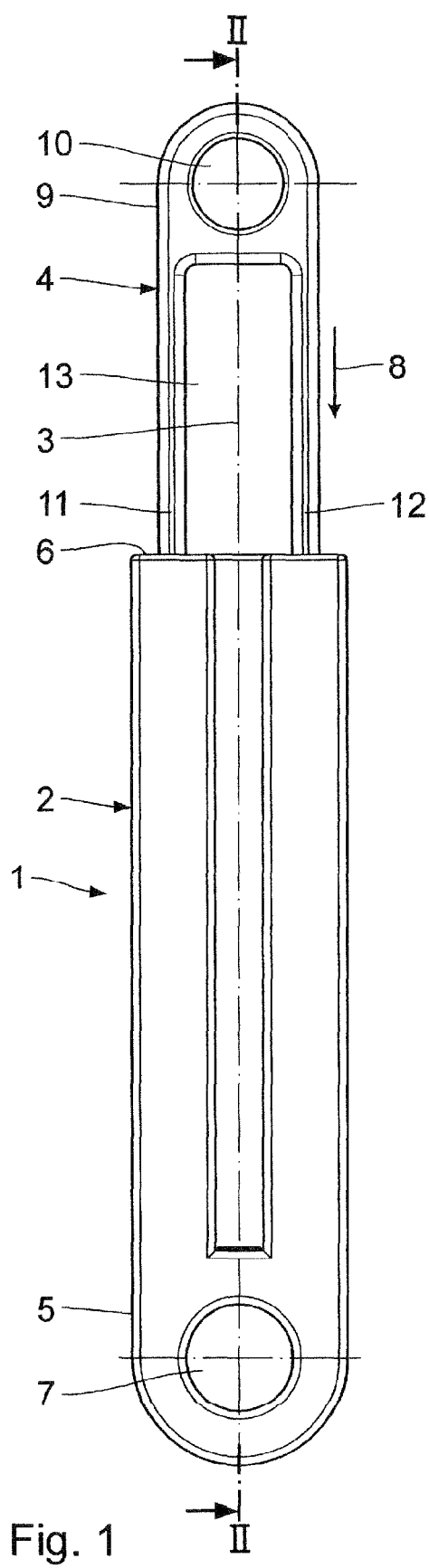
FIG. 1 shows an external view of a damper according to a first embodiment.
Figure 2:
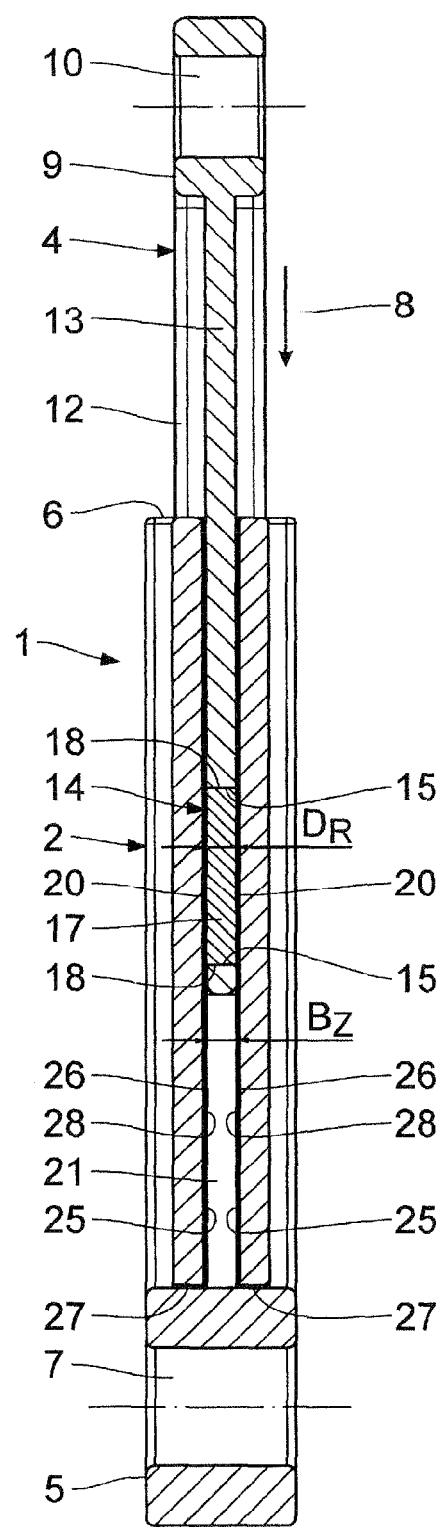
FIG. 2 shows a cross-section according to cutting line II-II in FIG. 1.
Figure 3:
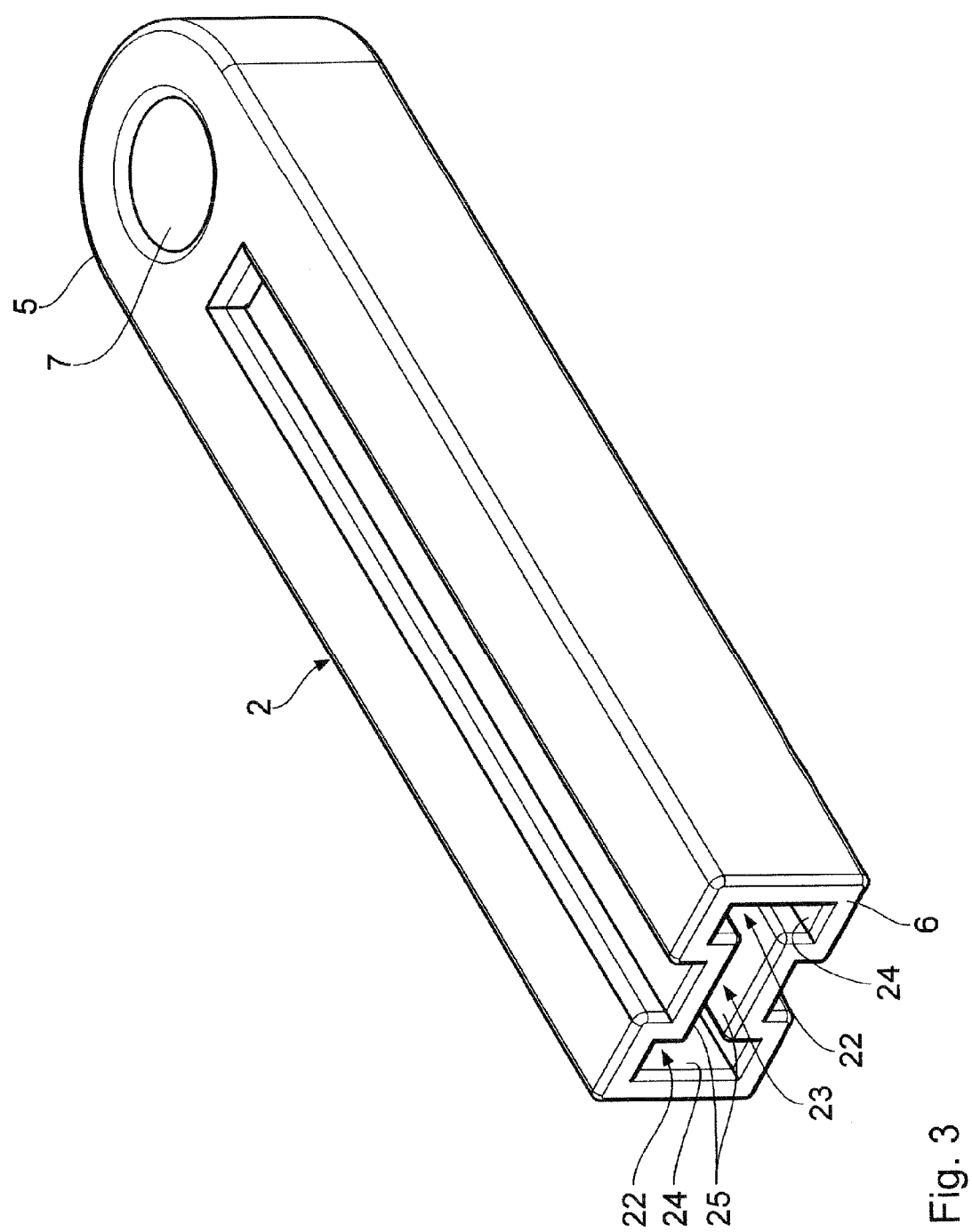
FIG. 3 shows the housing of the damper according to FIG. 1.
Figure 4:
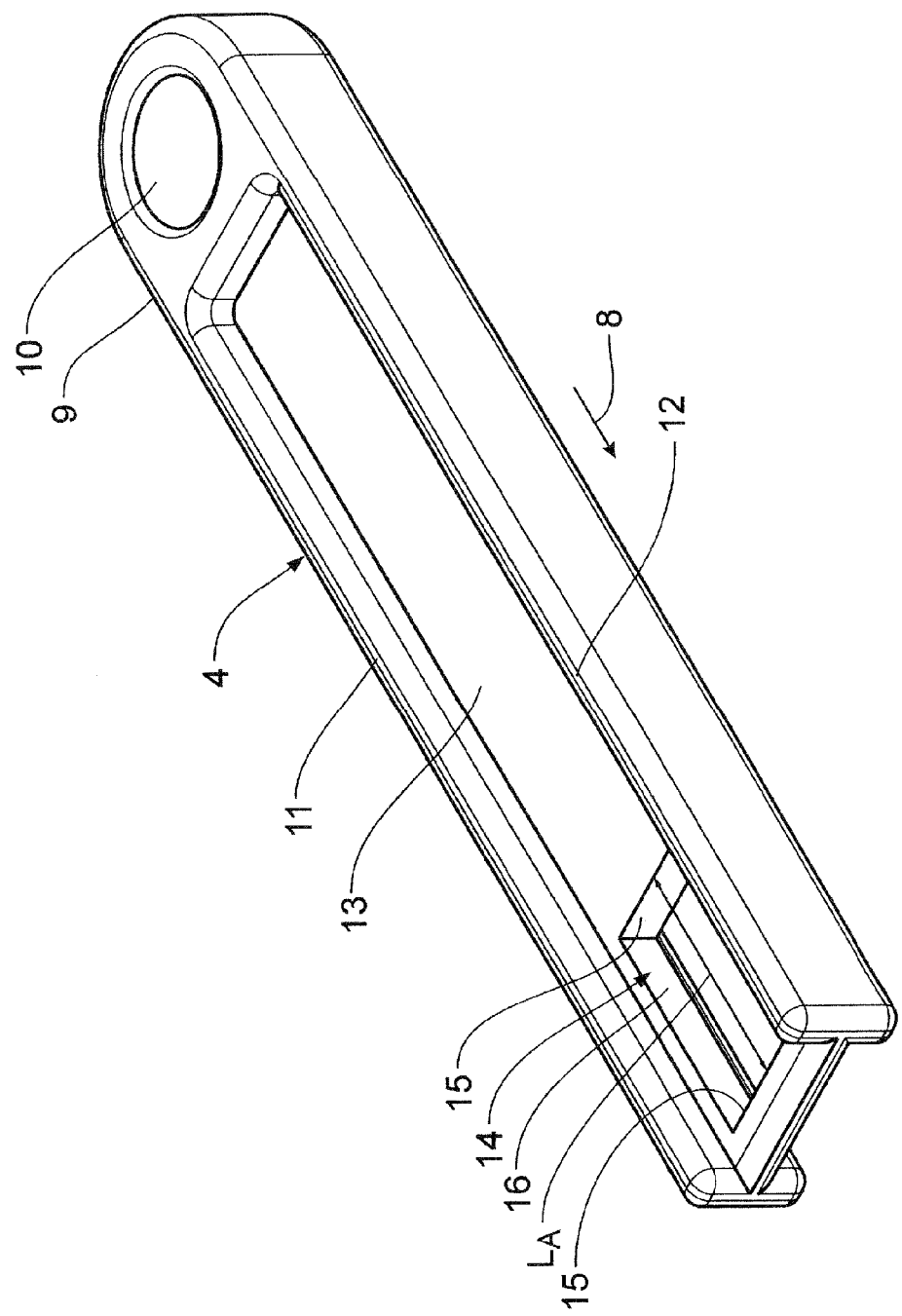
FIG. 4 shows the plunger of the damper according to FIG. 1.
Figure 5:
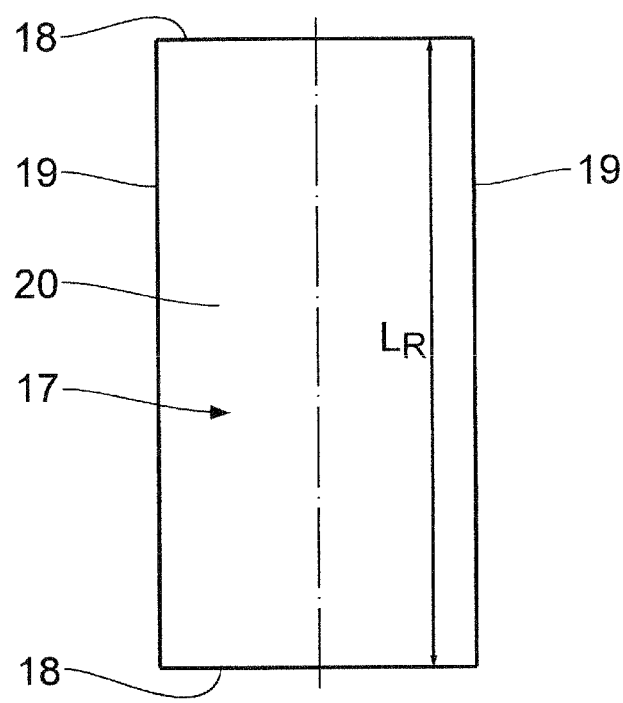
FIG. 5 shows the friction lining of the damper according to FIG. 1.

A first embodiment of the invention is described below with reference to FIGS. 1 to 5. A damper 1 has a housing 2 with a central longitudinal axis 3, in which a plunger 4 is displaceably guided. The housing 2 is constructed as one part. It is also possible to provide the housing 2 composed of several parts, in particular two parts. The housing 2 has an outer, axial end 5 and an opposite end 6 facing the plunger 4. In the region of end 5 the housing 2 has a fastening element 7, in particular in the form of an eye, via which the housing 2 is fastened and coupled in the washing machine. The plunger 4 can be inserted into the housing 2 along an insertion direction 8, which runs parallel to the central longitudinal axis 3. At the outer end 9 of the plunger 4 located opposite direction 8, the plunger 4 has a fastening element 10 in the form of an eye, via which the plunger 4 is coupled and fastened in a washing machine. The plunger 4 can be prevented from being pulled fully out of the housing 2 by pull-out-limiting means, not illustrated.

Starting behind the fastening element 10 in direction 8, the plunger 4 has a double-T-shaped or H-shaped cross-section, which is formed by two side bridges 11, 12, running parallel to one another, and by an intermediate bridge 13, arranged between them, which connects the side bridges 11, 12 to one another. The intermediate bridge 13 runs perpendicular to the side bridges 11, 12. In the region of the end of the plunger 4 located in direction 8, provided in the intermediate bridge 13 is a friction lining recess 14, which fully penetrates the intermediate bridge 13, in other words is open to two sides—top and bottom. The recess 14 is limited on the circumferential side, i.e. in the plane formed by the intermediate bridge 13, towards all sides by the intermediate bridge 13. The recess 14 has a rectangular shape with parallel end faces 15 located along direction 8 and parallel longitudinal sides 16 connecting them. Arranged in the recess 14 is a friction lining 17, the shape of which in the simplest case corresponds substantially to that of the recess 14. The friction lining 17 is thus cuboid, its end faces 18 resting against the end faces 15 of the recess 14 and its longitudinal sides 19 resting against the longitudinal sides 16 of the recess 14. Otherwise the friction lining 17 has two friction surfaces 20, running parallel to one another and forming the top and bottom of the cuboid. The friction lining 17 consists, for example, of a suitable foam material. The friction lining 17, which is itself preferably constructed as one part, rests directly against the edge of the recess 14 against the plunger 4, preferably constructed as one part.

The housing 2 encompasses a housing interior 21, the cross-sectional shape of which corresponds to the outer contour of the plunger 4, i.e. the housing 2 likewise has a double-T-cross-sectional shape. Formed in the housing 2 are two longitudinal channels 22, extending along the central longitudinal axis 3 and corresponding to the side bridges 11, 12, which are connected to one another by an intermediate channel 23 corresponding to the intermediate bridge 13. The longitudinal channels 22 are limited by longitudinal channel walls 24. The intermediate channel 23 is limited by two intermediate channel walls 25, opposite one another and running parallel to one another. Fastened to the intermediate channel walls 25 are flat friction inserts 26, consisting of sheet metal. They are fixed in the region of the transition to the fastening element 10 by L-shaped offsets 27, provided in corresponding longitudinal grooves in the intermediate channel wall 25. The friction inserts 26 extend over the full length of the housing interior 21 and are located in each case between the intermediate channel walls 25 and the intermediate bridge 13 of the plunger 4. The housing 2 is advantageously made of plastics material. The friction inserts 26 may consist of steel sheet metal, for example.

The mode of functioning of the friction damper is described below. The desired frictional force can be set, for example, by the choice of thickness $D_R$ of the friction lining 17. In particular, the friction lining 17 may have a thickness $D_R$ which is greater than the width $B_Z$ of the intermediate channel 23. The friction lining 17 thus rests against the friction surfaces 28 of the friction inserts 26 with bias. In direction 8 and perpendicular thereto in the plane formed by the intermediate bridge 13, the friction lining 17 is held by the end faces 15 and longitudinal sides 16. One friction lining 17 rests directly against the friction surfaces 28 located opposite one another. Therefore precisely only one single friction lining 17 is required to have frictional effect on two opposite friction surfaces 28. The attenuation characteristics of the damper 1 can be largely freely set by the shape of the recess 14 and the circumferential configuration of the friction lining 17.

If the plunger 4 is inserted along direction 8, the friction lining 17 is initially partially compressed owing to the forces of static friction between friction surfaces 20 and friction surfaces 28, achieving a minimal free-wheeling effect. There then follows increasing build-up of kinetic friction force. The same applies to the subsequent pulling of the plunger 4 out of the housing 2 against direction 8. If the length $L_R$ of the friction lining 17 is smaller in the axial direction than the axial length $L_A$ of the recess 14, there is greater compression of the friction lining 17 when the plunger 3 (*sic*) is inserted or pulled out. A more marked free-wheeling effect thus occurs. If the length $L_R$ of the friction lining 17 is greater than the length $L_A$ of the recess 14, and the friction lining 17 is therefore axially biased in the recess 14, a lesser or no free-wheeling effect occurs. The build-up of frictional force is thus more abrupt. An advantage of the build-up is the characteristics which can be influenced, i.e., for example, free-wheeling or gentle build-up of frictional force. Corresponding characteristics have a positive effect on the running properties of the washing machine. For example, the ground forces are reduced and the acoustics improved.

Figure 6:
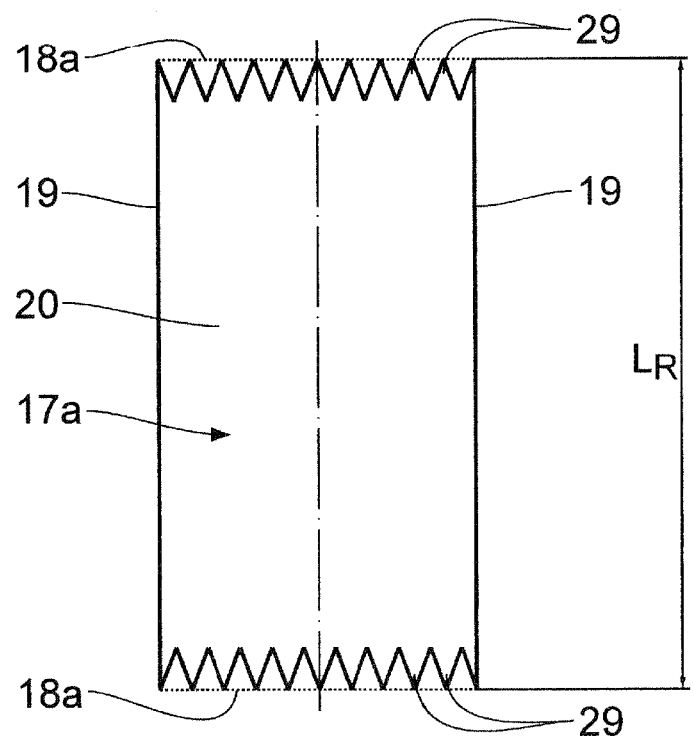
FIG. 6 shows a friction lining of a damper according to a second embodiment.

A second embodiment of the invention is described below with reference to FIG. 6. Identical parts are given the same reference numerals as in the first embodiment, to the description of which reference is herewith made. Structurally different, but functionally similar parts are given the same reference numerals with an a placed after them. The main difference from the first embodiment is in the configuration of the friction lining 17a. The friction lining 17a basically again has a cuboid shape with longitudinal sides 19 and end faces 18a. However, the axial ends are formed not by a planar end face, but by an indented outer contour with numerous points 29. The friction lining 17a thus has end faces 18a which are meandering in cross-section. Again, three cases can be distinguished. If $L_R$ is approximately equal to $L_A$, a greater free-wheeling effect arises, as the points 29 are more easily compressed. There is thus a very gentle, progressive build-up of frictional force. If $L_R$ is smaller than $L_A$, an even more marked free-wheeling effect occurs owing to the slipping of the friction lining 17a in the recess 14. If $L_R$ is greater than $L_A$, the gentle build-up of frictional force is increasingly eliminated by the points 29 therefore already compressed in the initial state.

Figure 7:
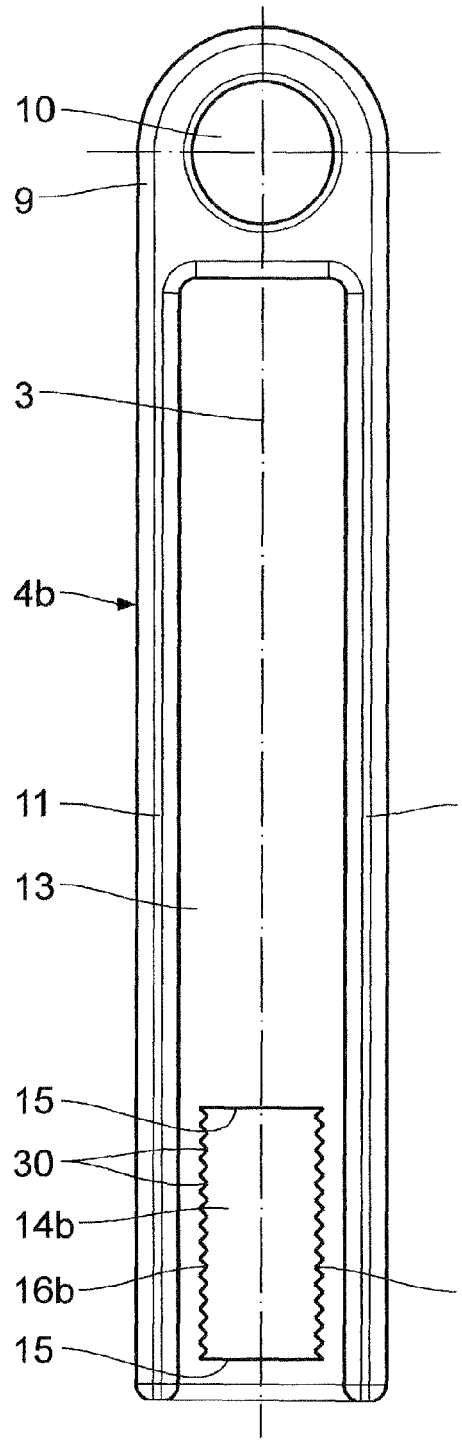
FIG. 7 shows a plunger of a damper according to a third embodiment.

A third embodiment of the invention is described below with reference to FIG. 7. Identical parts are given the same reference numerals as in the first embodiment, to the description of which reference is herewith made. Structurally different, but functionally similar parts are given the same reference numerals with a b placed after them. The main difference from the first embodiment is that the longitudinal sides 16b, which limit the recess 14b laterally, are constructed not as smooth, but as indented or meandering. The points 30 of the longitudinal sides 16b press into the friction lining 17 from the side, so it is better fixed along direction 8.

Owing to the axial fixing no free-wheeling effect occurs. The build-up of frictional force is not so gentle at the start of insertion or pushing out of the plunger 4, but more abrupt. The friction lining 17 may additionally have teeth on its longitudinal sides 19, which match the longitudinal side 16b.

Figure 8:
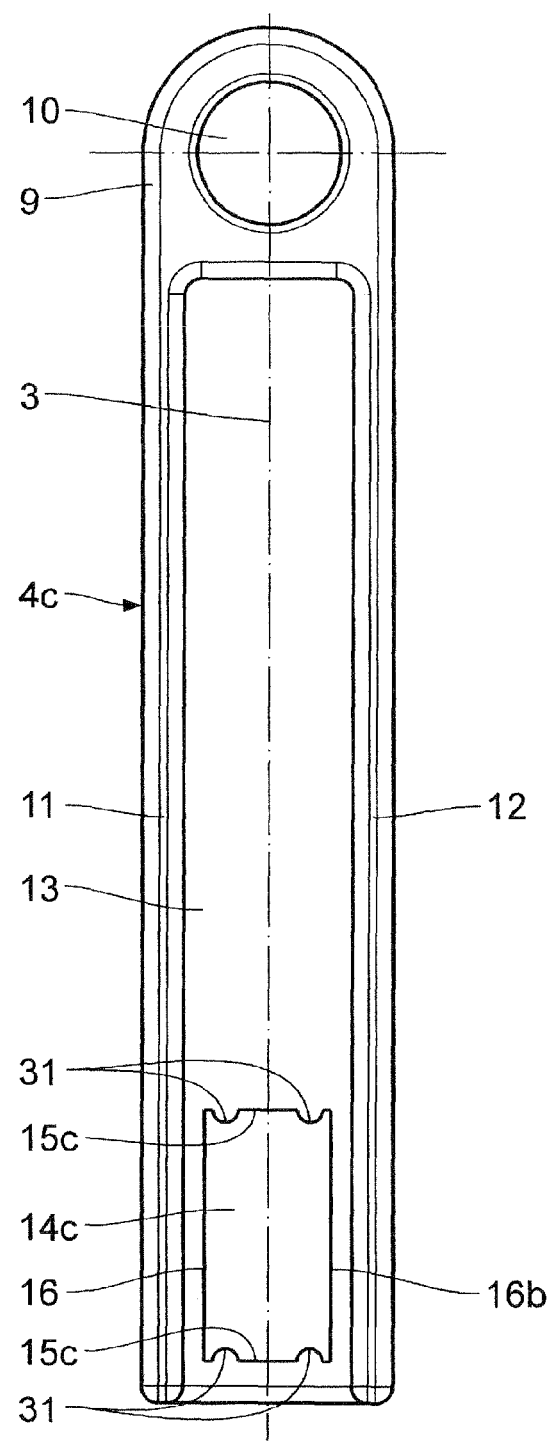
FIG. 8 shows a plunger of a damper according to a fourth embodiment.

A fourth embodiment of the invention is described below with reference to FIG. 8. Identical parts are given the same reference numerals as in the first embodiment, to the description of which reference is herewith made. Structurally different, but functionally similar parts are given the same reference numerals with a c placed after them. The main difference from the first embodiment is that the end faces 15c are not planar, but are provided with lugs 31 projecting into the recess 14c, in particular two lugs. If the friction lining 17 has a length $L_R$ corresponding to the distance between the opposite points of the lugs 31, a gentle free-wheeling effect occurs owing to the compression of the friction lining 17. There is a gentle, progressive build-up of frictional force. The lugs 31 first penetrate the friction lining 17. Only then does the respective end face 18 of the friction lining 17 encounter the end face 15c of the recess 14c. If the friction lining 17 is shorter than the distance between the points of the lugs 31, a more marked free-wheeling effect occurs, owing to the slipping of the friction lining 17 in the recess 14c. There is thus a gentle, progressive build-up of frictional force.

A fifth embodiment of the invention is described below with reference to

Figure 9:
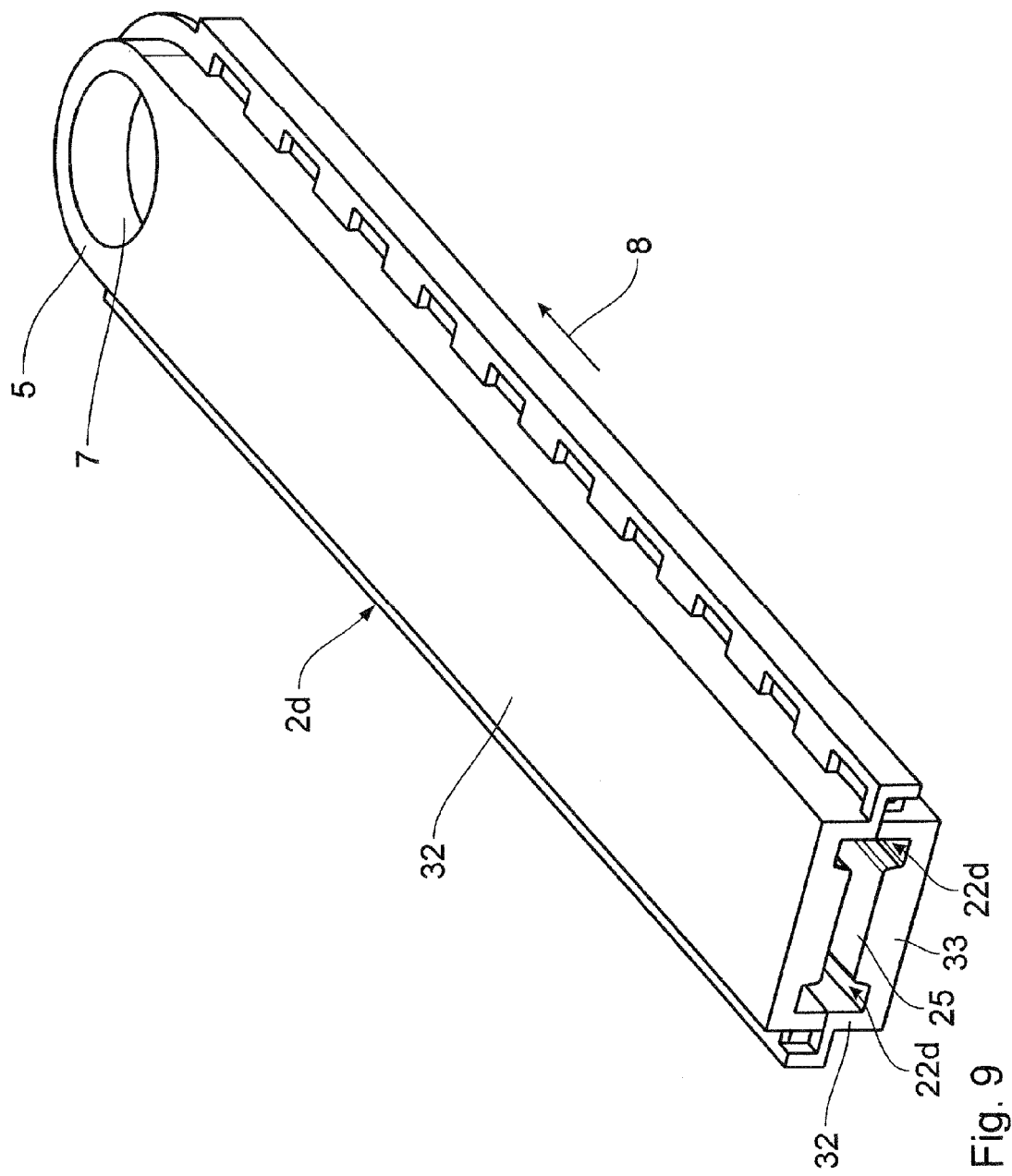
FIG. 9 shows a housing of a damper according to a fifth embodiment.
Figure 10:
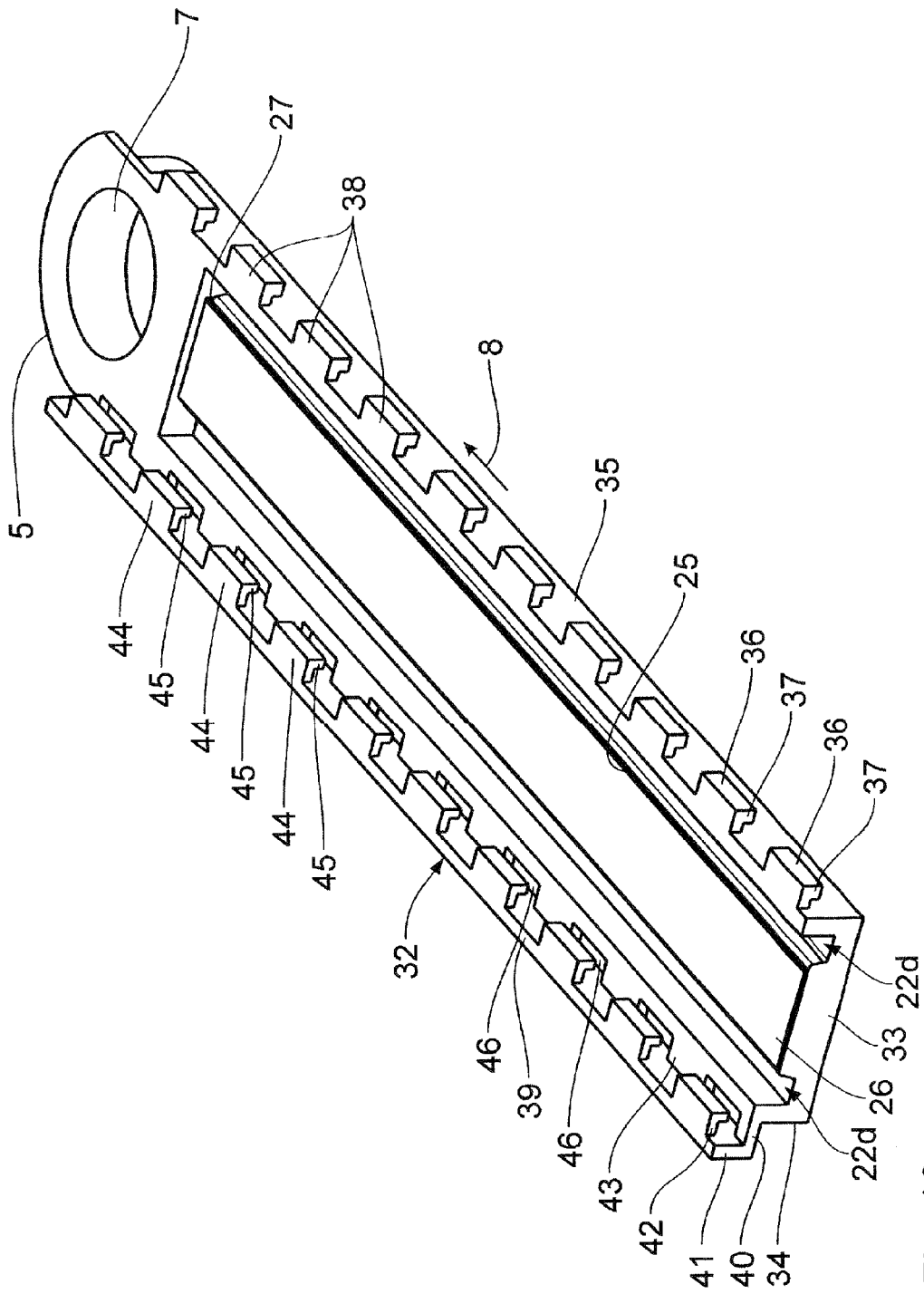
FIG. 10 shows a housing part of the housing according to FIG. 9.

FIGS. 9 and 10. Identical parts are given the same reference numerals as in the first embodiment, to the description of which reference is herewith made. Structurally different, but functionally similar parts are given the same reference numerals with a d placed after them. The main difference from the first embodiment is that the housing 2d is not constructed as one part, but consists of two preferably identical housing parts 32, locked to one another, for example. The connecting mechanism for connecting the two housing parts 32 is a linear bayonet, which is braced in the last part of the locking movement. In principle, locking of the two parts 32 is also possible. The housing part 32 has a base plate 33, on the axial end 5 of which a fastening element 7 is provided. On the inside of the base plate 33, one half of the longitudinal channels 22 is formed in the shape of longitudinal grooves. Between them is located the intermediate channel wall 25, projecting upwards, on which the friction insert 26, consisting of sheet metal, is arranged. The base plate 33 has two axially extending, outer longitudinal flanks 34, 35. Along flank 35 teeth 36 are provided laterally, i.e. projecting outwards, with lugs 37 projecting downwards in the manner of a toothed strip. The top of the teeth 36 defines a planar first sliding face 38.

In the region of the longitudinal flank 34 is formed a rail 39, U-shaped in cross-section, extending axially and open towards the base plate 33, consisting of a lower strip 40, a central strip 41 running perpendicular thereto and an upper strip 42 arranged parallel to the lower strip 40 and connected to the central strip 41. The top of the lower strip 40 defines a second sliding face 43, sliding faces 38 and 43 being located in the same plane. The upper strip 42 is formed by a row of teeth 44 with lugs 45, corresponding to teeth 36 and lugs 37 and located at the same axial height. Recesses 46 are provided in the lower strip 40 in the region of the teeth 44, to simplify removal from the mould during the injection-moulding process of the housing part 32. For assembly, two housing parts 32 are placed on top of one another, offset by one tooth position, and then displaced axially by one tooth position, so the two housing parts 32 are overlapped and locked to one another. Catching lugs, not illustrated, are provided on the lugs 37 for this purpose, which prevent the housing parts 32 slipping apart. An advantage of the configuration of the housing parts 32 is the fact that they can be easily produced. It is also possible to dispense with integrated axial securing, which produces locking, and to produce axial securing of the two housing parts 32 by joining a layer of rubber and a spacing bush in the eye.

Figure 11:
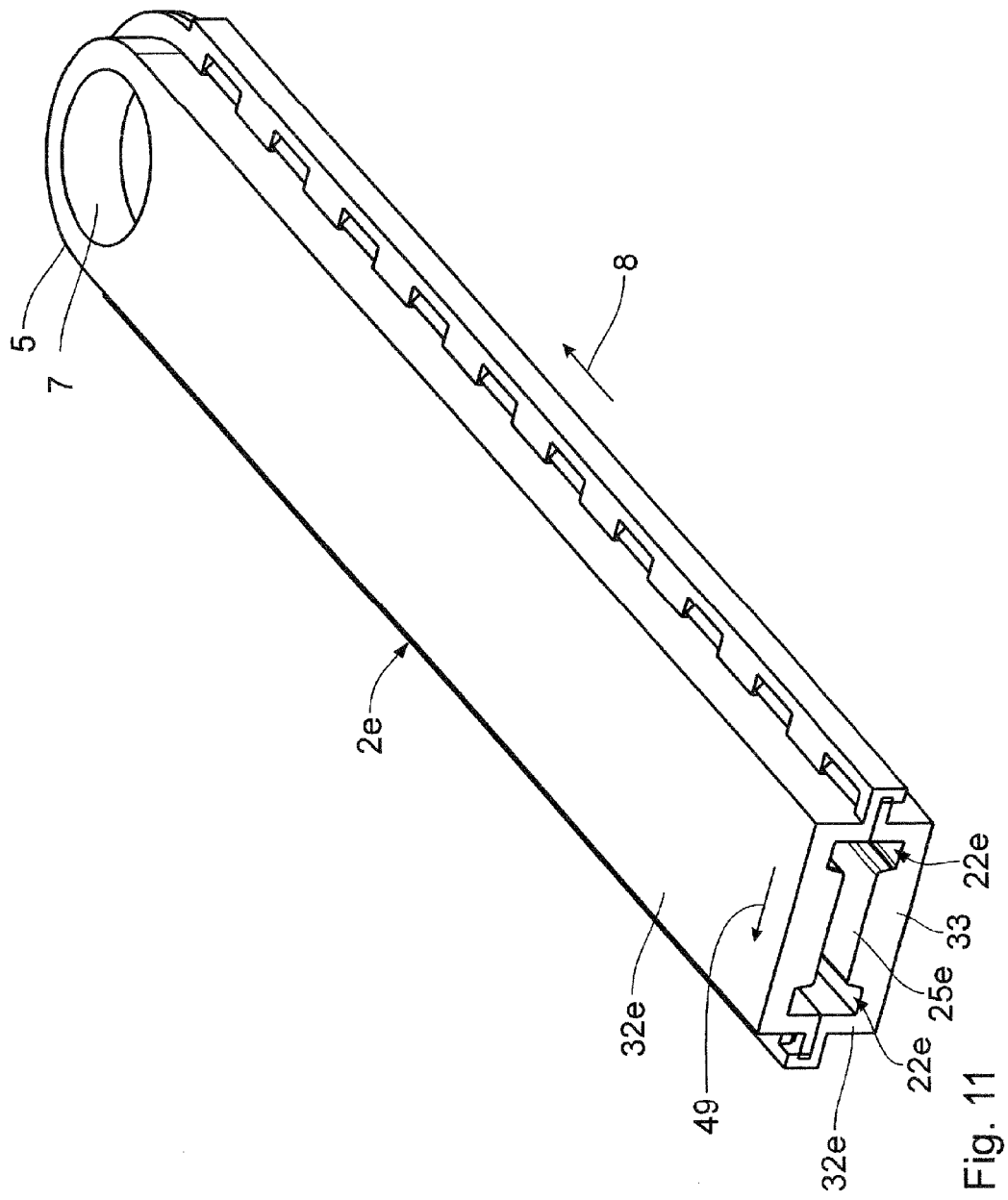
FIG. 11 shows a housing of a damper according to a sixth embodiment.
Figure 12:
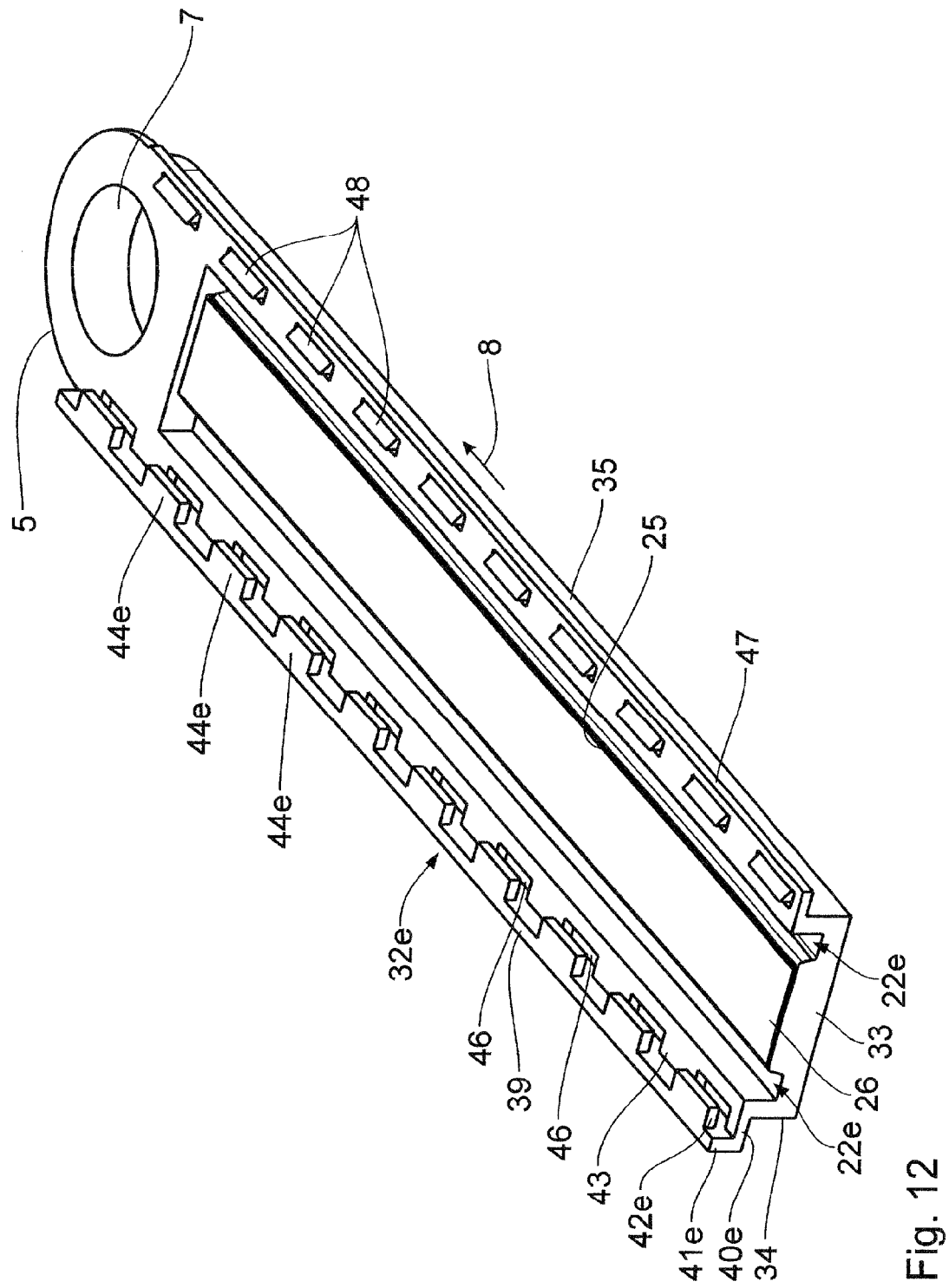
FIG. 12 shows a housing part of the housing according to FIG. 11.

A sixth embodiment of the invention is described below with reference to FIGS. 11 and 12. Identical parts are given the same reference numerals as in the first embodiment, to the description of which reference is herewith made. Structurally different, but functionally similar parts are given the same reference numerals with an e placed after them. The main difference from the fifth embodiment according to FIGS. 9 and 10 is in the configuration of the catching elements and the locking movement. On the right side of the base plate 33 in FIG. 12 is provided a continuous strip 47 with catching lugs 48 projecting upwards, the catching lugs 48 decreasing in profile laterally outwards transversely to the central longitudinal axis 3. As in the fifth embodiment, formed on the opposite side of the base plate 33 is a rail, U-shaped in cross-section, with strips 40e, 41e, 42e. Strip 42e is formed by catching teeth 44e, arranged above recesses 46e. During assembly, two housing parts 32e are placed on top of one another at the same axial height and locked together perpendicular to direction 8 along a catching direction 49. The catching lugs 48 of the upper housing part 32e engage in the recesses 46e of the lower housing part 32e. The same applies to the corresponding, opposite row of catching lugs 48.

Figure 13:
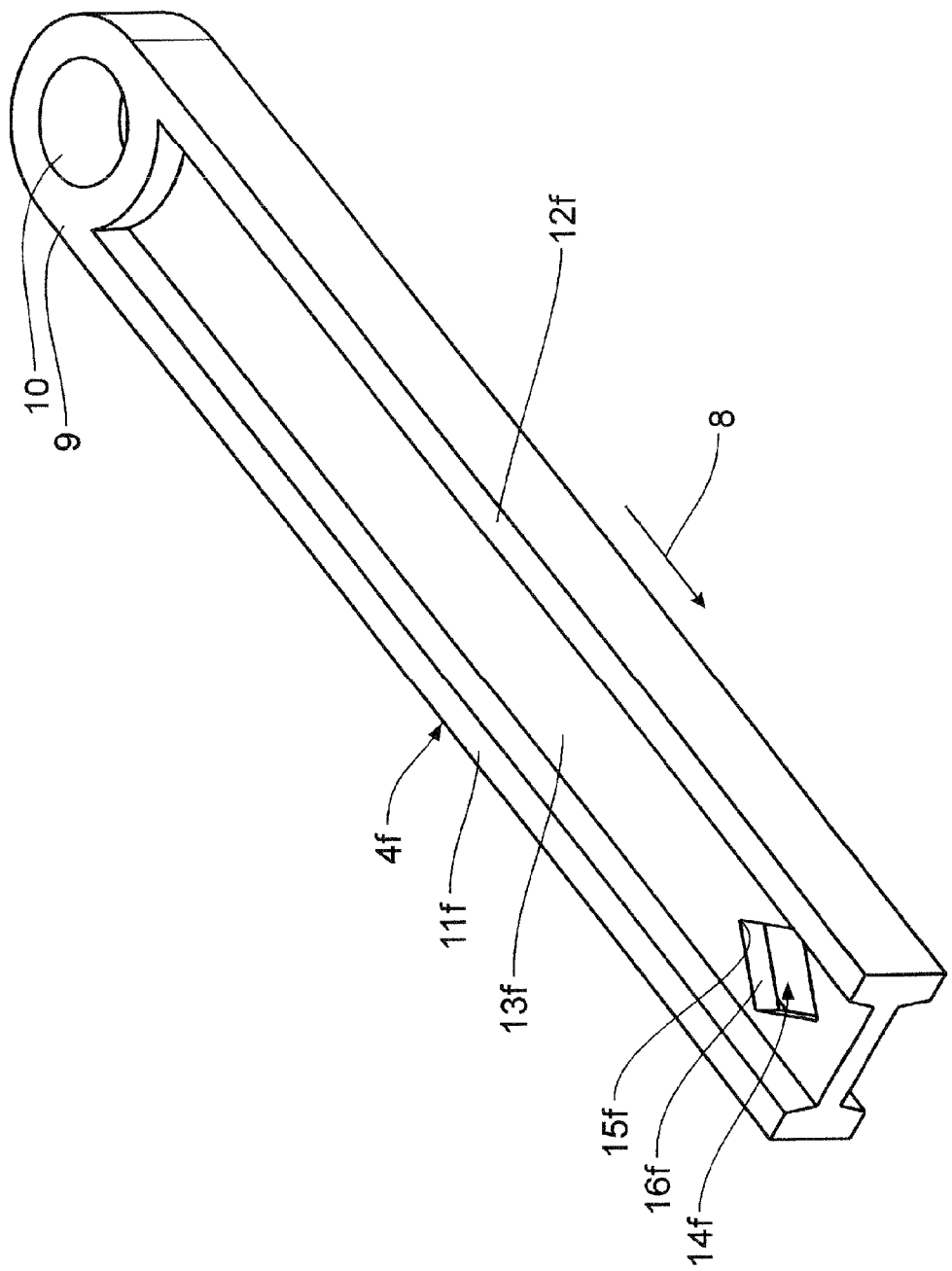
FIG. 13 shows a plunger of a damper according to a seventh embodiment.

A seventh embodiment of the invention is described below with reference to FIG. 13. Identical parts are given the same reference numerals as in the first embodiment, to the description of which reference is herewith made.

Structurally different, but functionally similar parts are given the same reference numerals with an f placed after them. The main difference from the first embodiment is in the configuration of the friction lining recess 14f. This is diamond-shaped, i.e. two opposite sides are parallel to one another in each case, are not perpendicular to one another and all the sides are the same length. Two opposite points face along the insertion direction 8. In the diamond-shaped friction lining recess 14f is arranged a diamond-shaped friction lining, not illustrated, matching the recess 14f. The advantage of the diamond-shaped configuration is the reduction of the static friction points at the start of a friction process. The friction lining is constructed tapering to a point along direction 8, so the static friction forces acting on the points are lower at the start of a movement. The diamond-shaped configuration of the recess and the friction lining results in an improved running property of the damper. Otherwise, the plunger has a trough-shape in the region of the side bridges 11f and 12f and of the intermediate bridge 13f, which shape is explained in greater detail with the aid of the next embodiment, reference herewith being made thereto.

Figure 14:
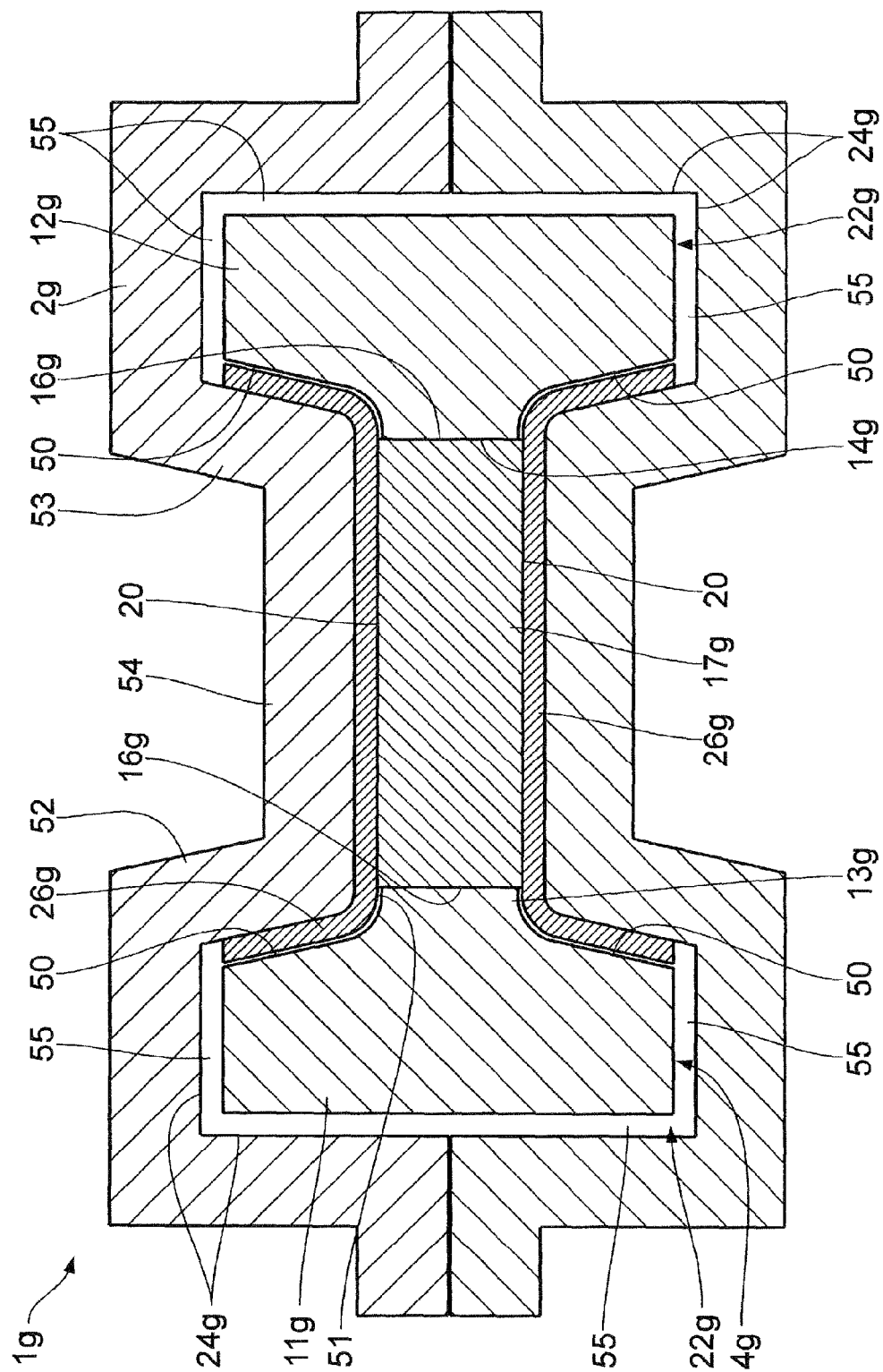
FIG. 14 shows a cross-section in the region of the friction lining recess of a damper according to an eighth embodiment.

An eighth embodiment of the invention is described below with reference to FIG. 14. Identical parts are given the same reference numerals as in the first embodiment, to the description of which reference is herewith made. Structurally different, but functionally similar parts are given the same reference numerals with a g placed after them. The main difference from the first embodiment is in the configuration of the indentation formed by the side bridges 11g and 12g and by the intermediate bridge 13g on the top and bottom of the plunger 4g. In the first embodiment, the plunger has on the top and the bottom in each case a U-shaped, i.e. overall an H-shaped, cross-section, i.e. the outer walls of the side bridges are perpendicular to the intermediate bridge. In the present embodiment this is different. There the top and the bottom of the plunger 4g have a trough-shaped indentation. This means that the inner faces 50 of the side bridges 11g and 12g enclose with the bottom face 51, formed by the outside of the intermediate bridge 13g, an angle of more than 90°, i.e. the inner faces 50 run obliquely outwards. The housing 2g has a corresponding trough-shaped constriction, formed by side bridges 52 and 53, which run parallel to the inner faces 50, and an intermediate bridge 54, which runs parallel to intermediate bridge 13g. Provided on the inside of bridges 52, 53 and 54 is a correspondingly shaped friction insert 26g, which rests against the inside of bridges 52, 53 and 54 and is fastened there. There is only a small amount of play between the legs of the friction insert 26g and the inner faces 50. Otherwise there is a greater amount of play 55 between the side bridges 11g and 12g and the inside of the housing 2g, so if the plunger 4g is in an oblique position in the housing 2g in the region of the play 55, there is no contact between the plunger 4g and the inside 2g. The double-trough-shaped configuration of the plunger 4g and the friction insert 26g causes the plunger 4g to be automatically centred in two dimensions in the sectional plane illustrated in FIG. 14 and continually brought back into the central position. Moreover, this avoids hard striking between the plunger 4g and the housing 2g.

What is claimed is:

1. A damper comprising:
   a) a housing (2; 2d; 2e; 2g) having a central longitudinal axis (3), at least partially encompassing a housing interior (21) by housing walls (24, 25),
   b) a plunger (4; 4b; 4c; 4f; 4g) displaceable in the housing (2; 2d; 2e; 2g) along the central longitudinal axis (3), guided out of the housing (2; 2d; 2e; 2g) and having at least one friction lining recess (14; 14b; 14c; 14f; 14g), wherein the friction lining recess (14; 14b; 14c; 14f; 14g) fully penetrates the plunger (4; 4b; 4c; 4f; 4g) and wherein the friction lining recess (14; 14b) is laterally limited by longitudinal sides (16b) being constructed as indented or meandering,
   c) fastening elements (7, 10), arranged at free ends (5, 9) of the housing (2; 2d; 2e; 2g) and the plunger (4; 4b; 4c; 4f; 4g), and
   d) at least one friction lining (17; 17a; 17g), arranged in the at least one friction lining recess (14; 14b; 14c; 14f; 14g), wherein said friction lining (17; 17a; 17g) is unitary and formed of one friction material,
   e) wherein the friction lining (17; 17a; 17g) has a thickness which is greater than a width of an intermediate channel of the housing (2; 2d; 2e; 2g), such that the friction lining (17; 17a; 17g) is permanently biased and in friction contact with said housing walls (25), and f) wherein when the plunger (4; 4b; 4c; 4f; 4g) is inserted or pulled-out of the housing (2; 2d; 2e; 2g), the friction lining (17; 17a; 17g) rubs against the friction lining recess (14; 14b; 14c; 14f; 14g), g) wherein the friction lining recess has an axial length (LA) being larger than an axial length (LR) of the friction lining (17; 17a; 17g), and h) wherein attenuation characteristics of the damper are defined by at least one of the difference in the axial length (LR) of the friction lining and the axial length (LA) of the friction lining recess, the shape of the friction lining recess and the friction lining, and the thickness of the friction lining.

2. The damper according to claim 1, wherein the friction lining recess (14; 14f) has at least one of a rectangular-shaped, diamond-shaped and rhombic-shaped form.

3. The damper according to claim 1, wherein the shape of the friction lining (17; 17f; 17g) is matched to the shape of the friction lining recess (14; 14f; 14g).

4. The damper according to claim 3, wherein the friction lining (17a) is constructed as indented on at least one end face (18a).

5. A damper comprising:
a) a housing (2; 2d; 2e; 2g) having a central longitudinal axis (3), at least partially encompassing a housing interior (21) by housing walls (24, 25),
b) a plunger (4; 4b; 4c; 4f; 4g) displaceable in the housing (2; 2d; 2e; 2g) along the central longitudinal axis (3), guided out of the housing (2; 2d; 2e; 2g) and having at least one friction lining recess (14; 14b; 14c; 14f; 14g), wherein the friction lining recess (14; 14b; 14c; 14f; 14g) fully penetrates the plunger (4; 4b; 4c; 4f; 4g) and wherein the friction lining recess (14b; 14c) is limited by end faces (15; 15c) located at axial ends of longitudinal sides (16; 16b), each longitudinal side (16; 16b) connecting said end faces (15, 15c), wherein the longitudinal sides (16; 16b) are constructed as jagged,
c) fastening elements (7, 10), arranged at free ends (5, 9) of the housing (2; 2d; 2e; 2g) and the plunger (4; 4b; 4c; 4f; 4g), and
d) at least one friction lining (17; 17a; 17g), arranged in the at least one friction lining recess (14; 14b; 14c; 14f; 14g), wherein said friction lining (17; 17a; 17g) is unitary and formed of one friction material,
e) wherein the friction lining (17; 17a; 17g) has a thickness which is greater than a width of an intermediate channel of the housing (2; 2d; 2e; 2g), such that the friction lining (17; 17a; 17g) is permanently biased and in friction contact with said housing walls (25),
f) wherein when the plunger (4; 4b; 4c; 4f; 4g) is inserted or pulled-out of the housing (2; 2d; 2e; 2g), the friction lining (17; 17a; 17g) rubs against the friction lining recess (14; 14b; 14c; 14f; 14g),
g) wherein the friction lining recess has an axial length (LA) being larger than an axial length (LR) of the friction lining (17; 17a; 17g), and
h) wherein attenuation characteristics of the damper are defined by at least one of the difference in the axial length (LR) of the friction lining and the axial length (LA) of the friction lining recess, the shape of the friction lining recess and the friction lining, and the thickness of the friction lining.

6. The damper according to claim 1, wherein the plunger (4) has a double-T-shaped cross section oriented perpendicular to an insertion direction.

7. A damper comprising:
a) a housing (2; 2d; 2e; 2g) having a central longitudinal axis (3), at least partially encompassing a housing interior (21) by housing walls (24, 25),
b) a plunger (4; 4b; 4c; 4f; 4g) displaceable in the housing (2; 2d; 2e; 2g) along the central longitudinal axis (3), guided out of the housing (2; 2d; 2e; 2g) and having at least one friction lining recess (14; 14b; 14c; 14f; 14g), wherein the friction lining recess (14; 14b; 14c; 14f; 14g) fully penetrates the plunger (4; 4b; 4c; 4f; 4g) and wherein the friction lining recess (14; 14b) is laterally limited by longitudinal sides (16; 16b) having points (30), said points (30) pressing into the friction lining (17) from the side,
c) fastening elements (7, 10), arranged at free ends (5, 9) of the housing (2; 2d; 2e; 2g) and the plunger (4; 4b; 4c; 4f; 4g), and
d) at least one friction lining (17; 17a; 17g), arranged in the at least one friction lining recess (14; 14b; 14c; 14f; 14g), wherein said friction lining (17; 17a; 17g) is unitary and formed of one friction material,
e) wherein the friction lining (17; 17a; 17g) has a thickness which is greater than a width of an intermediate channel of the housing (2; 2d; 2e; 2g), such that the friction lining (17; 17a; 17g) is permanently biased and in friction contact with said housing walls (25),
f) wherein when the plunger (4; 4b; 4c; 4f; 4g) is inserted or pulled-out of the housing (2; 2d; 2e; 2g), the friction lining (17; 17a; 17g) rubs against the friction lining recess (14; 14b; 14c; 14f; 14g),
g) wherein the friction lining recess has an axial length (LA) being larger than an axial length (LR) of the friction lining (17; 17a; 17g), and
h) wherein attenuation characteristics of the damper are defined by at least one of the difference in the axial length (LR) of the friction lining and the axial length (LA) of the friction lining recess, the shape of the friction lining recess and the friction lining, and the thickness of the friction lining.

* * * * *